United States Patent [19]

Phillips, Jr.

[11] 3,910,608
[45] Oct. 7, 1975

[54] FITTING FOR CONNECTING ELECTRICAL CONDUIT TO A JUNCTION BOX

[75] Inventor: Lawrence Phillips, Jr., South Laguna, Calif.

[73] Assignee: Unicorn Industries, Anaheim, Calif.

[22] Filed: Oct. 7, 1974

[21] Appl. No.: 512,239

[52] U.S. Cl. .................. 285/3; 174/65 R; 285/19; 285/158; 285/363
[51] Int. Cl.² .................................. F16L 41/00
[58] Field of Search ......... 174/65 R, 61, 62, 63, 64, 174/50; 317/107, 104, 111, 106; 285/158, 189, 19, 12, 3, 4, 363, 405, 176; 403/337

[56] References Cited
UNITED STATES PATENTS

| 950,176 | 2/1910 | Hublinger | 174/62 |
| 1,382,741 | 6/1921 | Pierson | 174/64 X |
| 2,862,040 | 11/1958 | Curran | 285/158 X |
| 3,055,683 | 9/1962 | Appleton | 285/158 |
| 3,650,548 | 3/1972 | Hussauf | 285/3 |
| 3,654,965 | 4/1972 | Gramain | 285/4 |

FOREIGN PATENTS OR APPLICATIONS

| 207,296 | 3/1957 | Australia | 285/363 |

Primary Examiner—Thomas F. Callaghan
Attorney, Agent, or Firm—Christie, Parker & Hale

[57] ABSTRACT

A hub for connecting electrical conduit to the top of a terminal box. The hub has a substantially rectangular housing with projecting sidewalls around the periphery of a top wall and a collar projecting from the center part of the top wall for receiving an electrical conduit. A substantially cylindrical inner wall is formed within the sidewalls and terminates in a common plane with the sidewalls. The collar is joined to the top wall within the perimeter of the inner wall, the top wall forming a sealing surface in the space between the perimeter of the collar and the inner wall. Mounting holes are formed in the top wall adjacent the corners of the housing outside the inner wall. Knock-out areas for additional openings are provided in the top wall within the limits of the inner wall. A gasket has a thin outer portion which engages the edges of the sidewalls and the inner wall, and a thick inner portion which engages the sealing surface of the top wall to form a seal within the perimeter of the inner wall.

6 Claims, 5 Drawing Figures 3,910,608

FITTING FOR CONNECTING ELECTRICAL CONDUIT TO A JUNCTION BOX

FIELD OF THE INVENTION

This invention relates to fittings for electrical conduit, and more particularly, to a waterproof hub for joining an electrical conduit to a terminal box.

BACKGROUND OF THE INVENTION

The use of hubs to connect conduits of different size to junction or service boxes is well known. The hub mounts on the top of the box, for example, and provides a collar to which a conduit can be connected. Electrical cable can then be run through the conduit into the box. A gasket may be used between the hub and the box and the hub is mounted on the box by screws extending through the housing at points outside the seal. Rather than using a gasket, code requirements permit the box to be formed with a upturned lip around the opening through which the cable enters the box if the housing extends beyond the margins of the upturned lip. The lip prevents water which may seep under the edge of the hub from getting inside the box through the cable opening in the top of the box.

One of the problems in industry with this type of an arrangement is that each junction box and each different size conduit to be joined to the junction box requires a different hub. The holes for receiving the mounting screws that secure the hub to the top of the box, as well as the size of the opening for the cable provided in the top of the box, vary substantially with different types and makes. Thus, in the past, the hub was specially designed to fit the particular box and mounting hole arrangement. As many as eight different mounting arrangements for attaching conduits through a hub to a junction box in outdoor electrical installations are to be found on the market today. Conduits may range from half-inch through four inches in diameter. Thus the electrical supply house must inventory a large number of hub sizes and designs to accommodate all the different junction boxes presently in use.

SUMMARY OF THE INVENTION

The present invention is directed to a universal design which is capable of providing an all-weather connection between an electrical conduit and the top of a junction box and which can be used with all known junction boxes on the market. One of the problems with providing a universal hub is that the mounting holes for some junction boxes are more closely spaced than the diameter of the cable opening in other junction boxes. This presents a sealing problem. Thus any seal large enough in diameter to seal the hub to the box having the largest opening would be outside the location of the mounting holes for mounting the hub to some other types of junction boxes. To have holes within the limits of the sealing area permits access of moisture into the inside of the hub and junction box and therefore is not acceptable.

The present invention overcomes this problem by providing both an inner and an outer seal, the inner seal being operative for small cable openings in the top of a junction box and the outer seal being for larger openings or for the more widely spaced mounting hole arrangements. The hub housing design and the gasket combine so that a single gasket provides both the inner and outer seal, permitting a single hub and gasket combination to provide a weather-proof conduit connection which can be used for many different designs of junction boxes.

BRIEF DESCRIPTION OF THE DRAWINGS

For a better understanding of the invention reference should be made to the accompanying drawings, wherein.

DETAILED DESCRIPTION

Figure 1:
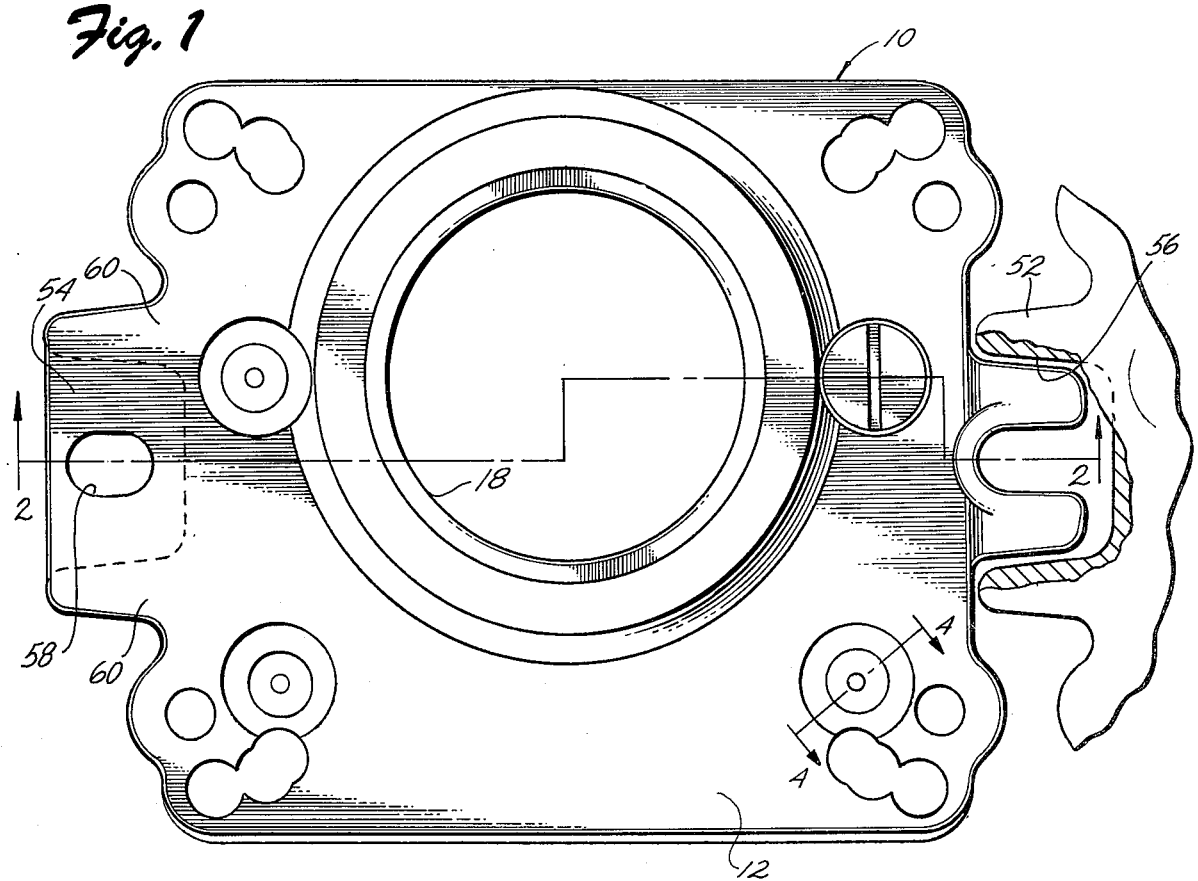
FIG. 1 is a top view of the hub of the present invention.

Referring to the drawings in detail, the number 10 indicates generally a hub housing which is preferably a single piece of cast metal such as an aluminum or zinc die casting. The housing includes a top wall 12 which is generally rectangular in shape and has projecting therefrom a collar 14. The inside of the collar is threaded, as indicated at 16, for receiving the threaded end of standard electrical conduit, or for receiving an adapter for connecting to a smaller size conduit. A hole 18 through the top wall 12 provides a passage for electrical cable to pass from the conduit through the housing.

The housing 10 terminates in outer sidewalls 20, 22, 24, and 26 which extend around the outer perimeter of the four sides of the top wall 12. A generally cylindrical inner wall 28 projects downwardly from the top wall 12 within the confines of the sidewalls 20, 22, 24, and 26. The inner wall 28 and the sidewalls form roughly triangular open spaces inside each of the corners of the housing. The sidewalls and inner wall terminate in machined surfaces which lie in a common plane defining the bottom of the housing.

The top wall 12 has an inner surface 30 extending inwardly from the inner wall 28 and terminating in a lip 32 around the opening 18. The inner wall 28 is formed with an intermediate ledge 34 extending around the inner perimeter of the inner wall. The lip 32 acts as a bushing or wire guard to guide the wires through the opening in the terminal box without contact between the wires and the raw edge of the hole in the sheetmetal box.

Clusters of mounting holes are formed in the top wall 12 at each of the corners within the limits of the sidewalls and outside limits of the inner wall 28. Three of the holes have their centers closer together than the diameter of the holes so that the holes merge to form a single opening. A fourth hole 38 has its center located to one side. The center distances between the corresponding holes in the four groups are made to conform with the dimensions of the various mounting hole configurations found in conventional terminal boxes which are commercially available from various manufacturers.

Figure 4:
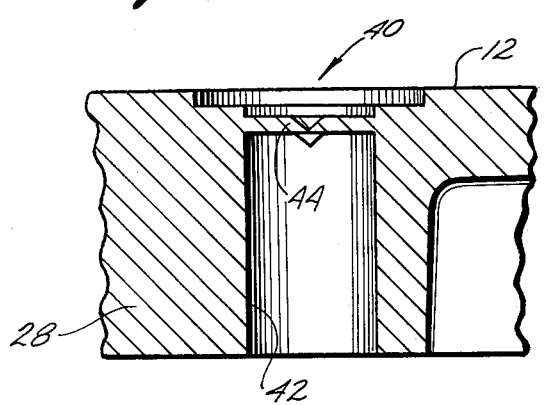
FIG. 4 is a partial sectional view taken on the line 4—4 of FIG. 1.

In addition, four knock-out holes 40 provided additional mounting screw locations which extend at least partially into the region inside the inner wall 28. As best seen in FIG. 4, each of the mounting holes 40 include a counterbore 42 in the inner wall 28. The counterbore terminates in a thin walled section 44 which normally seals off the interior of the housing but which can be knocked out when it is necessary to utilize the counterbore 42 as a mounting hole for receiving a mounting screw. Such a mounting screw is indicated at 46 in FIGS. 1 and 2, the mounting screw extending down through the counterbore 42 and threadedly engaging the top wall 48 of a junction box.

Figure 2:
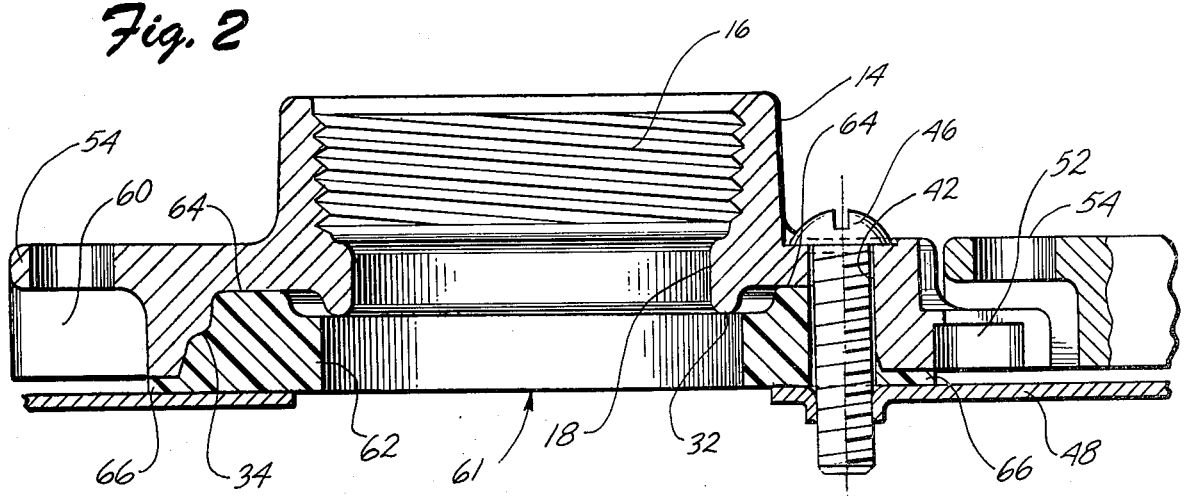
FIG. 2 is a sectional view taken substantially on the line 2—2 of FIG. 1 and showing the hub and gasket mounted on a junction box.
Figure 3:
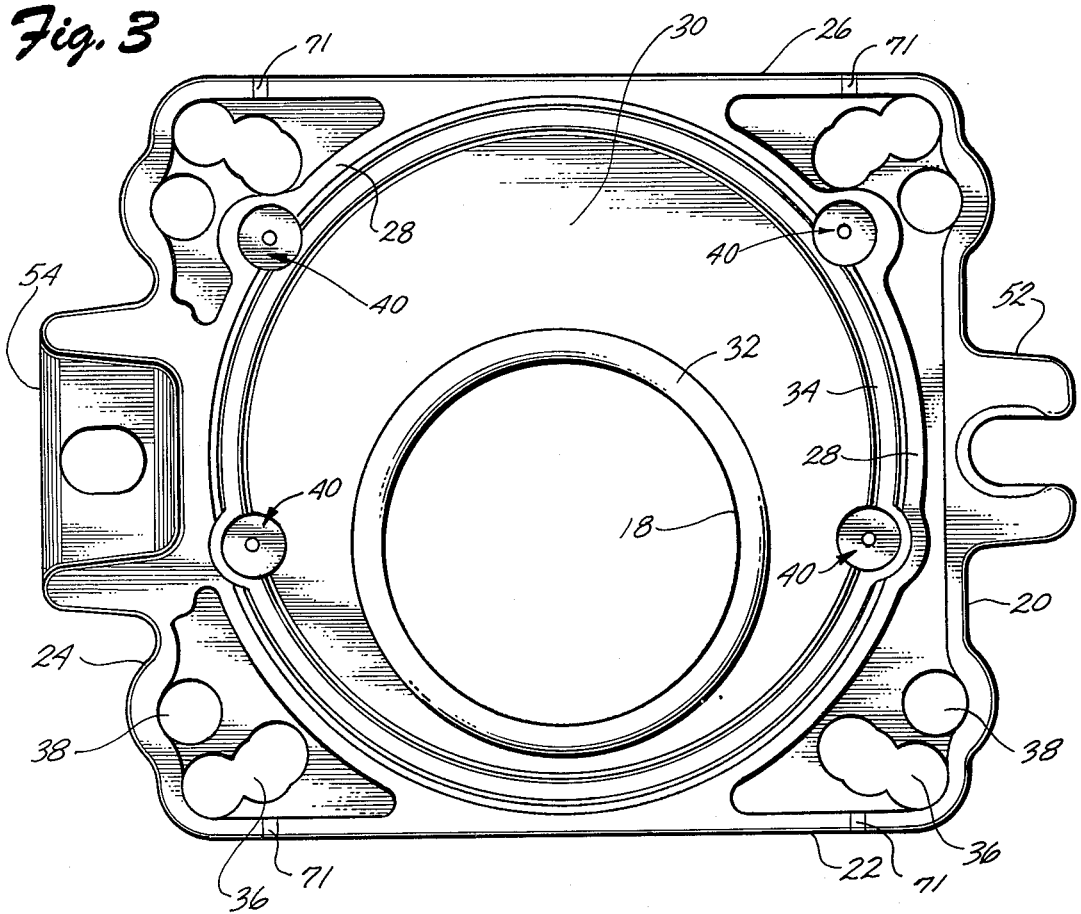
FIG. 3 is a bottom view of the hub without the gasket.

Projecting from the opposite sidewalls 20 and 24 of the hub housing are a pair of flanges indicated at 52 and 54, respectively. The flange 52 has an open-ended slot 56. The flange 52, as seen in FIG. 2, projects from the bottom edge of the sidewall and the bottom surface of the flange 52 forms a continuation of the common plane defined by the bottom edge of the sidewalls and the inner wall 28. The flange 54, on the other hand, as shown in FIG. 2, forms an extension of the top wall 12 and is provided with an elongated slot 58. The flange is strengthened by a pair of spaced vertical portions 60 which terminate at the lower end in the common plane with the bottom of the sidewalls of the housing. This arrangement permits nesting of adjacent hubs since the flange 52 of one hyb may be overlapped by the flange 54 of an adjacent hub.

As further shown in FIG. 2, the hub utilizes a gasket 61 made of a pliable rubber or plastic material which is molded to provide a relatively thick annular portion 62 which fits snugly inside the inner wall 28. The annular portion 62 has an off-center opening which is axially aligned with the collar 14 and is slightly larger in diameter than the lip 32. The annular thick portion 62 has a flat top surface 64 which engages the inner surface 30 of the top wall 12 within the inner wall 28. The gasket is further provided with a thin outer portion 66 having an outer edge 70 which is substantially identical in outline to the shape of the sidewalls of the housing. Holes are provided in the relatively thin outer portion 66 of the gasket which are aligned with the various mounting holes 36 and 38 at the four corners of the housing. In addition, holes are formed through the relatively thick annular portion 62 which are aligned with the knockout openings 40. Grooves 71 in the bottom surface of the outer walls 22 and 26 provide drainage for water entering the holes 36 and 38.

From the above arrangement it will be seen that the gasket 61 provides an effective seal under a wide variety of mounting situations. For example, if a particular junction box has a large opening for the conduit with widely spaced mounting holes, an effective seal is provided between the inner wall 28 and the top of the junction box by the thin outer portion 66 of the gasket. In the event that the junction box provides a much smaller opening with mounting screws utilizing the knock-out holes 40, the relatively thick portion 62 of the gasket 61 provides an effective seal between the surface 30 on the inside of the housing and the top of the junction box between the cable opening and the location of the mounting screws. Thus it will be seen that a hub and gasket design is provided which is capable of accommodating a large number of different mounting configurations and which still provides effective sealing against seepage of water into the junction box through the hub-conduit connection.

Figure 5:
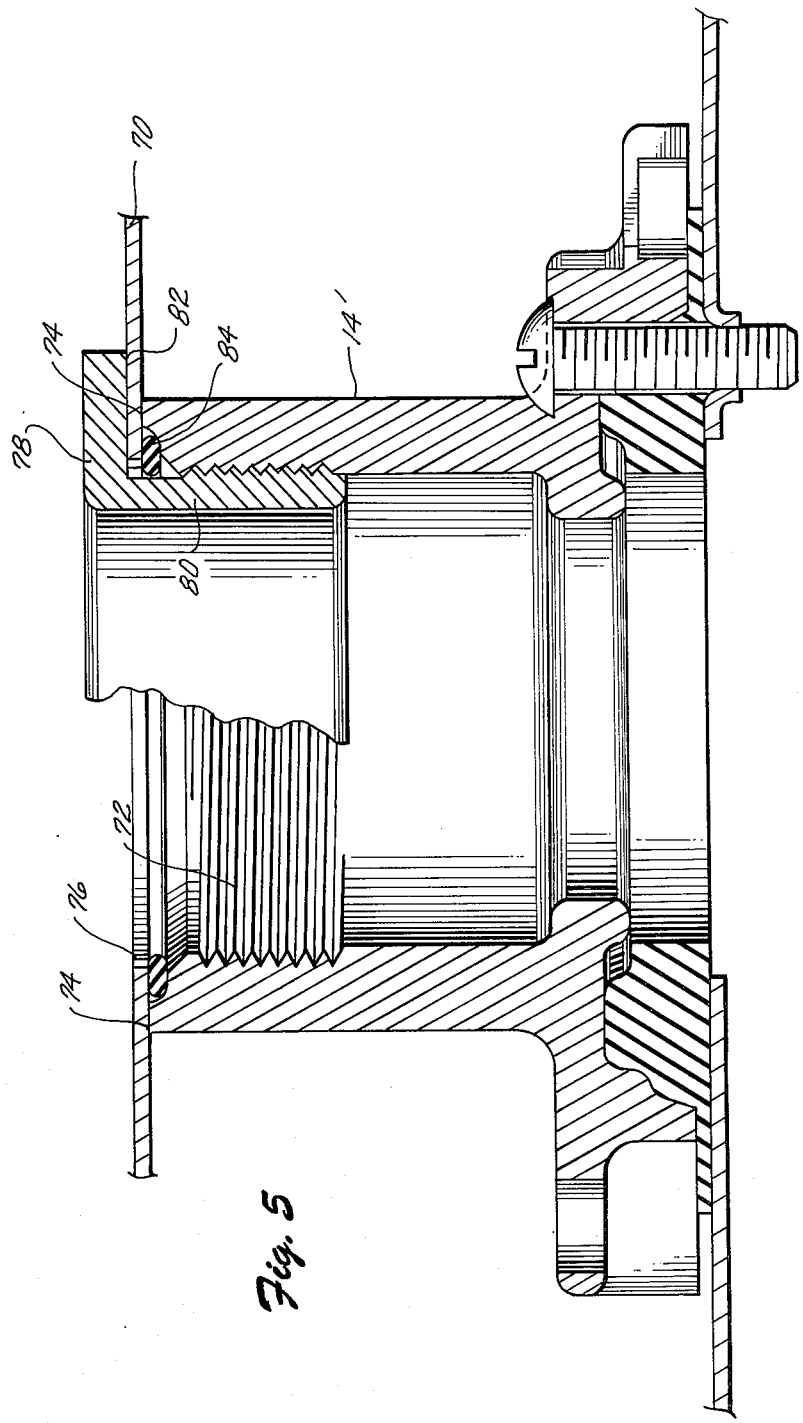
FIG. 5 is a partial sectional view of a modified hub connector.

Referring to the modification of FIG. 5, the collar 14' is arranged to provide direct connection between the hub and the bottom wall, indicated at 70, of a meter socket enclosure, or the like. In many applications, power lines are brought in from a pole or other source to a meter box in which the incoming lines are connected to terminals into which a standard watt meter can be plugged. The meter and the meter socket enclosure are normally sealed by the power company after installation. Output power lines are brought out from the meter box through a standard metal conduit or the like, which is threaded into the collar 14 of the hub shown in FIG. 1 to provide a fully enclosed wiring connection between the meter box and the service box.

The arrangement of FIG. 5 utilizes the collar of the hub to provide integral conduit connection between the bottom of the meter box and the service box on which the hub is mounted. The open end of the collar 14' in the modification of FIG. 5 is provided with an internal machine thread 72 rather than a tapered pipe thread. The top edge of the collar 14' is provided with a knurled surface 74 which engages the outside of the bottom wall 70 of the upper enclosure. The bottom wall 70 is provided with an opening 76 which is axially aligned with the collar 14' during installation. A hex nut 78 has an integral externally threaded sleeve 80 extending from a hexagonal flange portion 81. The sleeve 80 is inserted through the opening 66 and threaded into the collar 14'. When tightened down, the nut 78 clamps the upper enclosure wall 70 against the knurled surface 74. The underside of the flange 71 of the hex nut 78 may also be knurled, as indicated at 82, to prevent the nut from loosening. An O-ring 84, seated in the upper end of the collar 14', forms a water-tight seal between the collar and the upper enclosure.

With the arrangement of FIG. 5, it will be seen that the hub can be used as a direct coupling between a meter box and service box and provides a sealed passage for power leads. It avoids the need to use standard conduit coupling and the problems inherent therein. Particularly it avoids the problem of conduit extending up inside the meter box for attachment to the meter box, and thereby makes more room available for directing the leads in the meter box out of the box and through the hub into the service box. By eliminating a conduit nipple, the conduit bushing to protect the wiring in a standard installation is avoided and also the two locknuts that are needed to secure the nipple to the meter box. In addition, the knurled surfaces 74 and 82 insure a good ground connection between the two boxes, obviating any need for a separate ground lug terminal.

What is claimed is:

1. A water-tight fitting for connecting an electrical conduit or other wire enclosing means to a junction box or the like, comprising:

a housing having a top wall and sidewalls integral with and extending around the periphery of the top wall, the sidewalls terminating in a common plane, an annular inner wall projecting from the top wall and terminating in said common plane, a collar integrally joined to the top wall within the perimeter of the inner wall, the collar forming a central passage extending through the top wall, the top wall forming a surface on the inside of the housing between the inner wall and the collar, the top wall having a plurality of mounting openings in each of the corners between the sidewalls and the inner wall, the top wall having at least two knockout areas within the inner wall for forming additional mounting holes.

2. The fitting of claim 1 wherein the top wall is substantially rectangular and parallel to said common plane.

3. The fitting of claim 1 further including a pair of flanges projecting from opposite sidewalls, a first one of the flanges having a surface lying in said common plane, a second one of the flanges having a surface spaced from said common plane a distance slightly greater than the thickness of the first flange, whereby the flanges of adjacent fittings can overlap.

4. The fitting of claim 1 further including a sealing gasket having a thin outer portion extending from inside the inner wall to beyond the sidewalls and having a thick inner portion, the inner portion being thicker than the outer portion by an amount equal to the distance between said surface formed by the top wall within the inner wall and said common plane, whereby the gasket forms an inner and an outer seal between a surface on which the housing is mounted and respectively the sidewalls, the inner wall, and said surface, the gasket having openings therein through the thick portions that are aligned with the knockout areas.

5. The fitting of claim 1 wherein the collar is internally threaded.

6. The fitting of claim 1 further including a nut having an externally threaded sleeve adapted to engage the internally threaded collar for securing the end of the collar against an adjacent surface.

* * * * *